(12) United States Patent
Ouyang (10) Patent No.: US 7,516,778 B2
(45) Date of Patent: Apr. 14, 2009

(54) MAGNETO-HYDRODYNAMIC HEAT SINK

(75) Inventor: Chien Ouyang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 395 days.

(21) Appl. No.: 11/220,177

(22) Filed: Sep. 6, 2005

(65) Prior Publication Data

US 2007/0051500 A1 Mar. 8, 2007

(51) Int. Cl.
*F28D 15/00* (2006.01)
*H05K 7/20* (2006.01)
*F28F 7/00* (2006.01)

(52) U.S. Cl. .................. 165/104.33; 165/80.4; 361/699

(58) Field of Classification Search ............ 165/104.33, 165/80.4, 104.22, 104.23; 361/699, 687, 361/697; 417/353, 356; 62/3.7, 435
See application file for complete search history.

(56) References Cited

U.S. PATENT DOCUMENTS

| | | | |
|---|---|---|---|
| 3,654,428 A | | 4/1972 | Barkan |
| 3,654,528 A | | 4/1972 | Barkan |
| 4,505,815 A | * | 3/1985 | Lindler ........................ 210/223 |
| 5,134,545 A | * | 7/1992 | Smith ......................... 361/712 |
| 5,145,329 A | * | 9/1992 | Zumbusch et al. ........... 417/356 |
| 5,160,752 A | | 11/1992 | Urayama et al. |
| 5,355,942 A | | 10/1994 | Conte |
| 6,263,957 B1 | * | 7/2001 | Chen et al. .................. 165/80.4 |
| 6,766,817 B2 | | 7/2004 | da Silva |
| 6,918,404 B2 | | 7/2005 | Dias da Silva |
| 7,066,586 B2 | | 6/2006 | da Silva |
| 7,269,007 B2 | * | 9/2007 | Ouyang ...................... 361/687 |
| 2004/0162457 A1 | * | 8/2004 | Maggiore et al. .............. 600/1 |

(Continued)

FOREIGN PATENT DOCUMENTS

EP 0 000 856 2/1979

(Continued)

OTHER PUBLICATIONS

PCT International Search Report and PCT Written Opinion of the International Authority for International application No. PCT/US2006/034059, mailed May 23, 2007, 12 pages.

(Continued)

*Primary Examiner*—Tho v Duong
(74) *Attorney, Agent, or Firm*—Osha Liang LLP (57) ABSTRACT

A heat sink uses a pump assembly to generate a radial magnetic field. Pipes arranged to house a portion of a first channel and a portion of a second channel are formed in the heat sink. The direction of fluid flow in the first channel and the direction of fluid flow in the second channel is dependent on the radial magnetic field. The radial magnetic field causes fluid in the first channel to flow toward a heat source and fluid in the second channel to flow away from the heat source, thereby resulting in heat transfer between the first and second channels and between the heat sink and the respective first and second channels. The heat sink may also use a heat exchanger assembly that is connected to the heat source, where the heat exchanger assembly is formed of a plurality of channels that each propagate fluid in one of the directions of the first channel and the second channel.

22 Claims, 13 Drawing Sheets

U.S. PATENT DOCUMENTS

2005/0160752 A1 7/2005 Ghoshal et al.
2005/0183848 A1* 8/2005 Cheng et al. .......... 165/104.33

FOREIGN PATENT DOCUMENTS

WO 2005/061972 7/2005

OTHER PUBLICATIONS

High-Performance Liquid Metal Cooling Loops Authors: U. Ghoshal, D. Grimm, S. Ibrani, C. Johnston, and A. Miner nanoCoolers, Inc. as published in the 21st IEEE Semi-Therm Symposium Sep. 2005; 4 pages.

Free Surface Heat Transfer and Innovative Designs for Thin and Thick Liquid Walls Authors: A.Y. Ying, N. Morley, S. Smolentsev, K. Gulec, and P. Fogarty Mechanical & Aerospace Engineering Department UCLA, Los Angeles, CA 90095 Draft copy submitted to ISFNT-5, Rome Sep. 1999; pp. 1-8.

* cited by examiner

MAGNETO-HYDRODYNAMIC HEAT SINK

CROSS-REFERENCE TO RELATED APPLICATIONS

The present application contains subject matter that may be related to the subject matter in the following U.S. applications filed on Sep. 6, 2005 and assigned to the assignee of the present application: "Magneto-Hydrodynamic Heat Sink" 11/219,964; and "Magneto-Hydrodynamic Heat Sink" 11/219,965.

BACKGROUND

Figure 1:
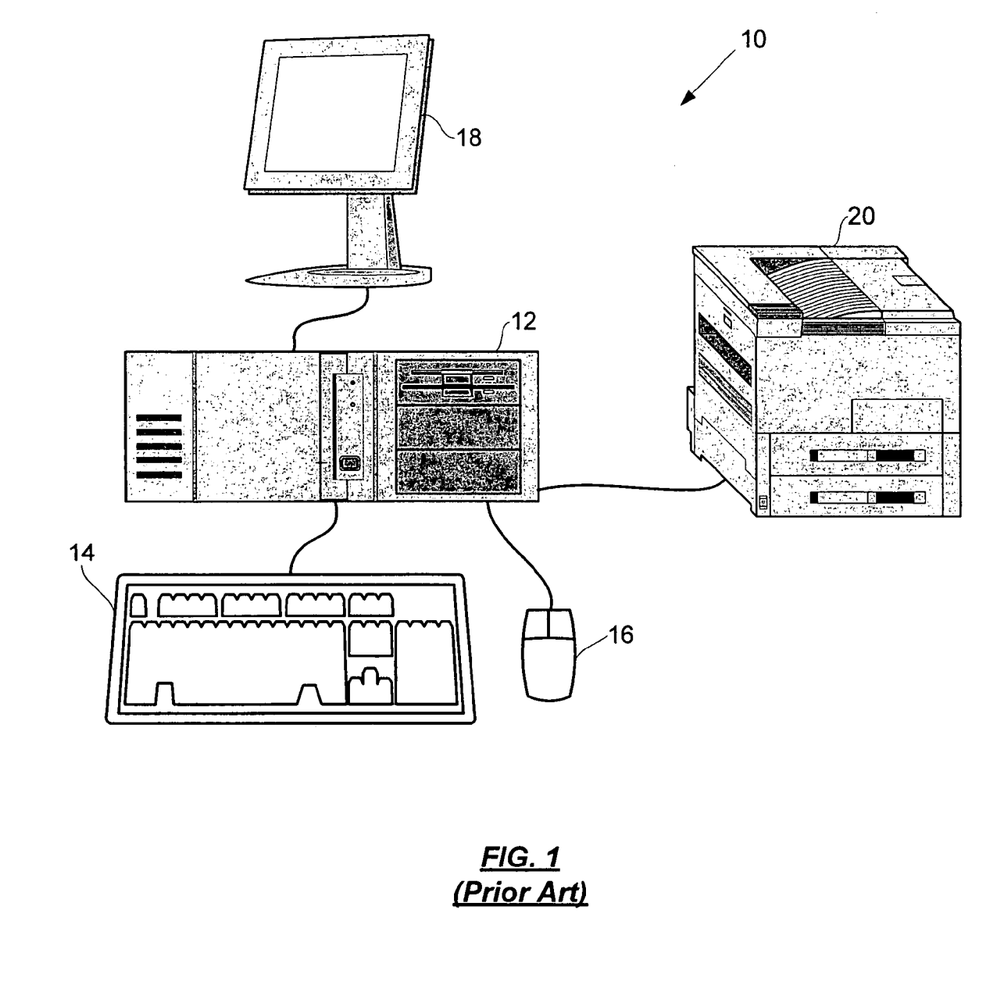
FIG.1 shows a computer system.

A computer system 10, as shown in FIG. 1, includes several components that are collectively used by a user to perform various functions such as, for example, preparing and generating a document with a word processor application. With the computer system 10, the user may input data to a computing portion 12 using peripheral devices such as a keyboard 14 or a mouse 16. Data may also be provided to the computing portion 12 using data storage media (e.g., a floppy disk or a CD-ROM (not shown)). The computing portion 12, using memory and other internal components, processes both internal data and data provided to the computing portion 12 by the user to generate data requested by the user. The generated data may be provided to the user via, for example, a display device 18 or a printer 20. The computing portion 12 of a computer system typically includes various components such as, for example, a power supply, disk drives, and the electrical circuitry required to perform the necessary and requested operations of the computer system.

Figure 2:
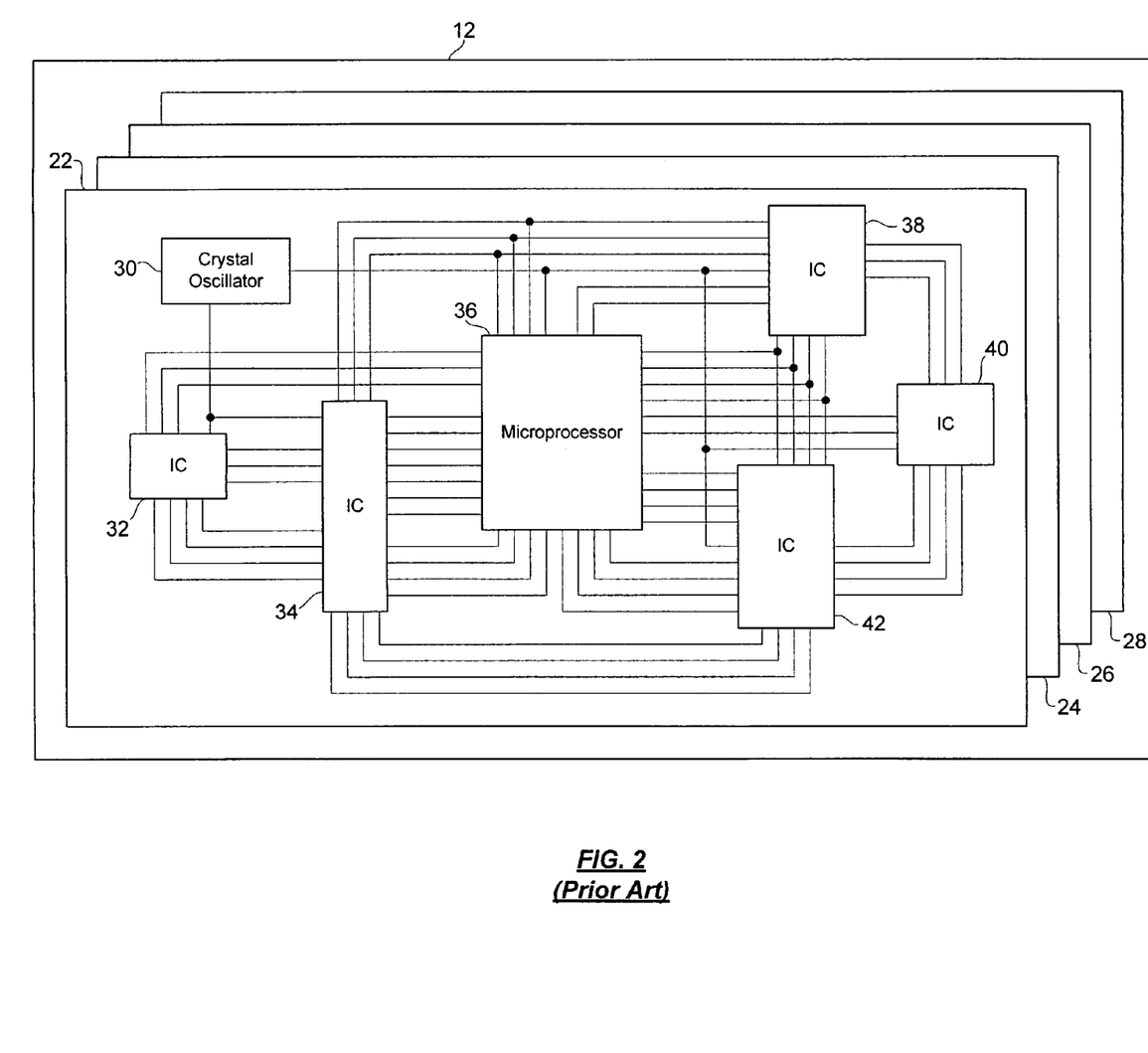
FIG.2 shows a portion of a computer system.

As shown in FIG. 2, the computing portion 12 may contain a plurality of circuit boards 22, 24, 26, 28 (e.g., printed circuit boards (PCBs) or printed wiring boards (PWBs)) on which various circuit components are implemented. For example, a computing portion designed to have enhanced sound reproducing capabilities may have a circuit board dedicated to implementing circuitry that specifically operate to process data associated with the reproduction of sound.

In FIG. 2, the components of exemplary circuit board 22 are shown. A crystal oscillator 30 provides a reference of time to various integrated circuits (ICs) 32, 34, 36, 38, 40, 42 (e.g., application specific integrated circuits (ASICs), field-programmable gate arrays (FPGAs), microprocessors, logic gates) that are connected to the circuit board 22. The integrated circuits 32, 34, 36, 38, 40, 42 communicate with one another, i.e., pass data, using wires or traces of conductive material (e.g., copper (shown, but not labeled)) embedded in the circuit board 22.

In operation, an integrated circuit, such as those shown in FIG. 2, dissipates heat as a result of work performed by the integrated circuit. Energy that is needed by the integrated circuit for work is not consumed with 100% efficiency, thereby resulting in excess energy that is released, among other things, as heat. As integrated circuits become more dense (i.e., more transistors per unit area) and faster (i.e., higher operating frequencies), they generate more heat. As excessive heat is damaging to an integrated circuit both in terms of performance and component integrity, an important design consideration involves ensuring that heat dissipated by an integrated circuit is sufficiently drawn away from the integrated circuit, where the efficiency of drawing away heat from the integrated circuit is expressed in terms of what is referred to as the "heat transfer rate."

Figure 3:
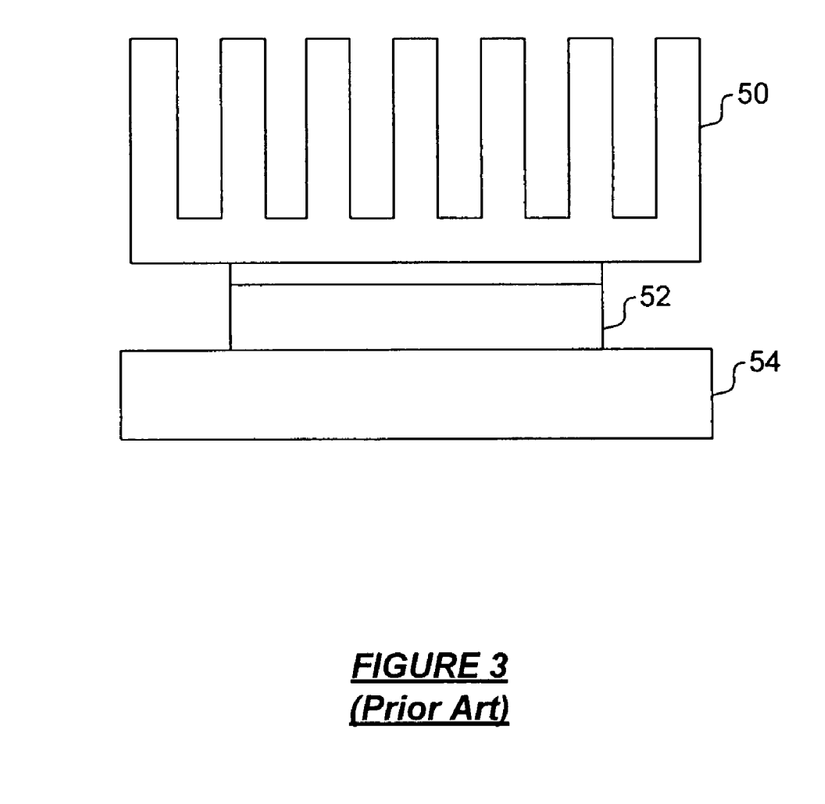
FIG.3 shows a heat sink as used with an integrated circuit.

"Heat sinks" are devices that are commonly used to cool integrated circuits. FIG. 3 shows a heat sink 50 as used with an integrated circuit 52 housed in a package 54 atop a substrate 56. The heat sink 50 is made of a high thermal conductivity metal (e.g., copper or aluminum). A "high thermal conductivity metal" is one that allows heat to pass through it because it contains many free electrons.

A base of the heat sink 50 is secured over the integrated circuit 52 by, for example, a retention clip (not shown) or an adhesive or thermal interface material (shown, but not labeled). During operation of the integrated circuit 52, the temperature of the integrated circuit 52 increases due to increased particle movement resulting from a build-up of excess energy. The increased integrated circuit temperature results in an increase in the temperature of the package 54, and consequently, of the heat sink 50. The increased temperature of the heat sink 50 results in an increase in the temperature of the air around the heat sink 50, whereby the heated air rises and effectively draws heat away from the integrated circuit 52. This process is referred to as "convection."

The removal of heat dissipated from an integrated circuit by a heat sink is dependent on numerous factors. For example, the thermal resistance of the package that houses the integrated circuit affects how much heat transfers from the integrated circuit to the heat sink. Also, the effectiveness of the adhesives between the integrated circuit and its package and the package and the heat sink affects how much heat transfers between these components. Moreover, the conductivity of the materials used in the package and the heat sink has a direct bearing on the amount of heat that is transferred away from the integrated circuit. The surface area of the heat sink is also important as more surface area results in more air being heated, thereby resulting in more heat being drawn away from the integrated circuit by the rising heated air.

SUMMARY

According to one aspect of one or more embodiments of the present invention, a computer system comprises a heat source and a heat sink operatively connected to the heat source, where the heat sink comprises: a first channel arranged to carry a fluid, a second channel arranged to carry the fluid, and a pump assembly arranged to control flow direction of the fluid in the first channel and the second channel dependent on a radial magnetic field generated by the pump assembly.

According to another aspect of one or more embodiments of the present invention, a method of cooling a heat source comprises: generating a radial magnetic field; propagating fluid in a heat sink toward the heat source dependent on the radial magnetic field; and propagating fluid in the heat sink away from the heat source dependent on the radial magnetic field.

According to another aspect of one or more embodiments of the present invention, a heat sink comprises: a body having a plurality of fins; a pump assembly disposed on a top surface of the body, the pump assembly arranged to generate a radial magnetic field; a heat exchanger assembly disposed on a bottom surface of the body; and a pipe arranged to house at least a portion of a first channel and at least a portion of a second channel, the pipe extending from past the top surface through the body to past the bottom surface, where fluid flow direction in the first channel and the second channel is dependent on the radial magnetic field.

Other aspects and advantages of the invention will be apparent from the following description and the appended claims.

DETAILED DESCRIPTION

Embodiments of the present invention relate to a heat sink that "cools" an integrated circuit using flowing fluid that carries heat away from the integrated circuit. The heat sink uses a pump assembly that generates a magnetic field to drive fluid flow. Accordingly, such a heat sink is referred to herein as a "magneto-hydrodynamic" heat sink.

Figure 4:
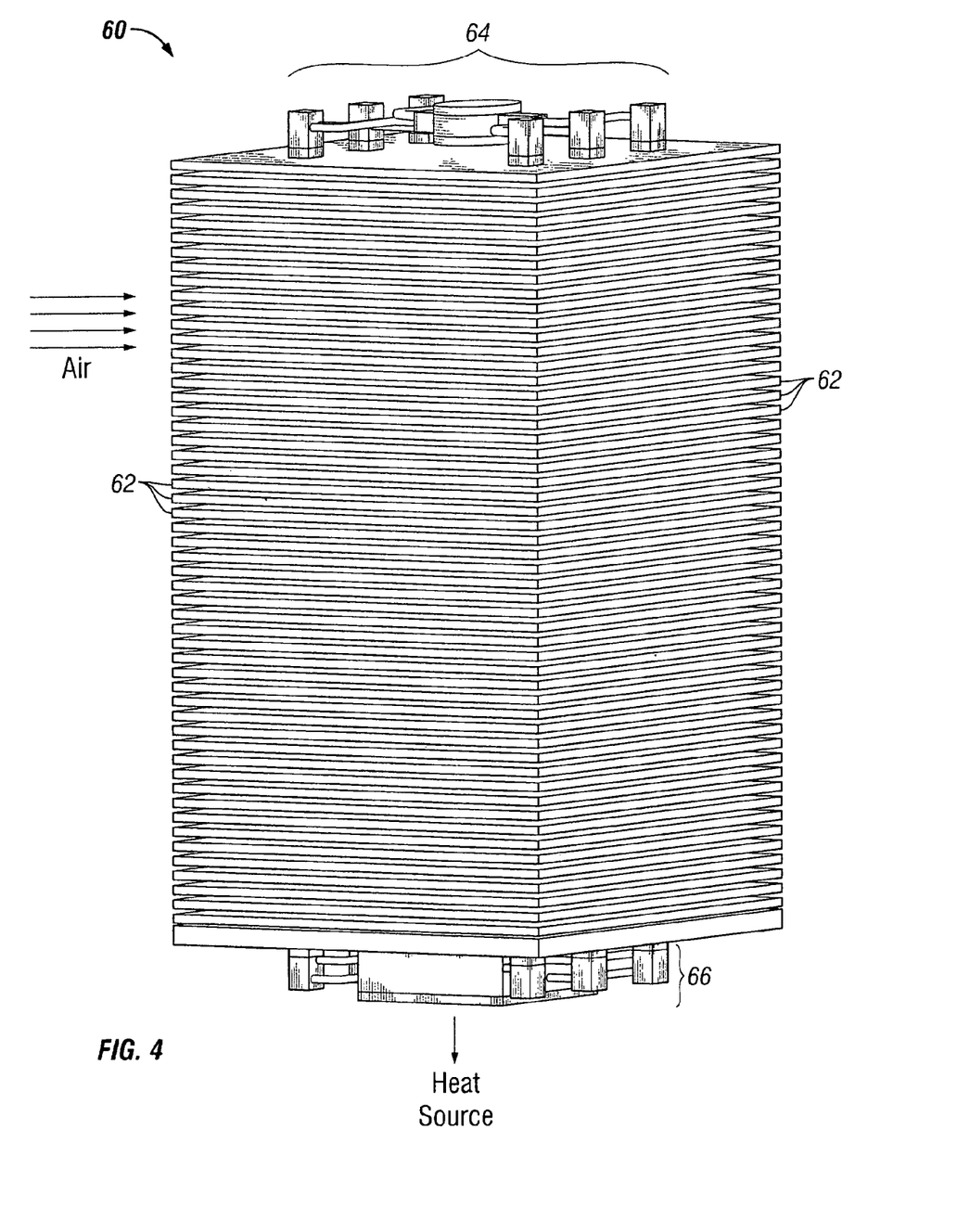
FIG.4 shows a side view of a heat sink in accordance with an embodiment of the present invention.

FIG.4 shows a side view of an exemplary heat sink 60 in accordance with an embodiment of the present invention. The heat sink 60 has a number of "fins" 62 that increase the amount of surface area of the heat sink 60 that is exposed to the outside air, thereby resulting in increased heat exchange between the heat sink 60 and the outside air. A pump and pipe assembly 64 (further described below with reference to FIGS. 5-11) is disposed on top of the heat sink 60. A heat exchanger assembly 66 (further described below with reference to FIGS. 12-15) is disposed on the bottom of the heat sink 60. The heat exchanger assembly 66 is arranged to attach to the heat source (e.g., integrated circuit) (not shown) to be cooled.

In one or more embodiments of the present invention, a heat sink may have a different fin configuration than that shown in FIG.4. Further, those skilled in the art will note that the heat sink 60 shown in FIG.4 is not necessarily to scale and is not limited to a particular length, width, and/or height.

Figure 5:
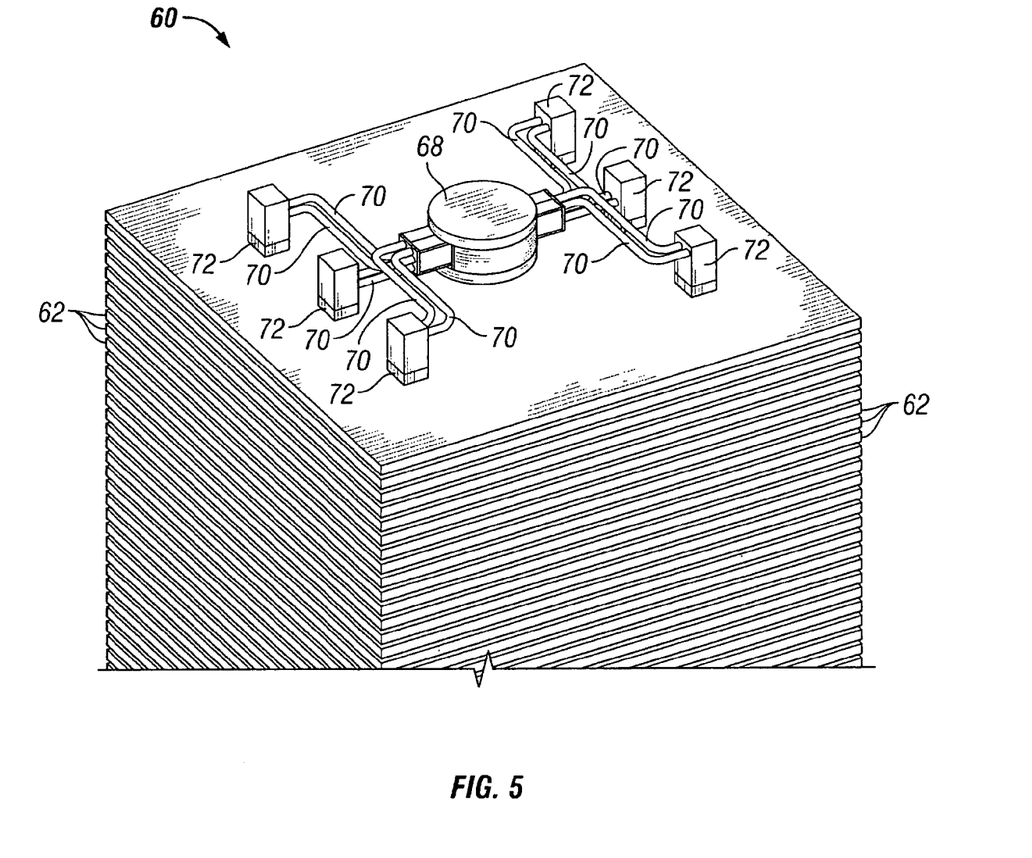
FIG.5 shows a top view of a heat sink in accordance with an embodiment of the present invention.

FIG.5 shows a top view of heat sink 60 in accordance with an embodiment of the present invention. The pump and pipe assembly 64 is formed of a pump assembly 68 (further described below with reference to FIGS. 6-11) through which fluid flows. As shown in FIG.5, the pump assembly 68 is circular in shape. However, in one or more other embodiments of the present invention, the pump assembly 68 may be of a different shape or geometry.

Fluid enters and exits the pump assembly 68 by way of single channel pipes 70. Pairs of single channel pipes 70 are each connected to two two-channel pipes 72 that may be bonded to and/or at least partially embedded within the heat sink 60. In one or more embodiments of the present invention, the two-channel pipes 72 may be formed of a highly thermally conductive metal (e.g., copper). Further, in one or more embodiments of the present invention, the fluid propagated through the pump assembly 68, the single channel pipes 70, and the two-channel pipes 72 is conductive so as to be capable of transferring heat.

As shown in FIG.5, six single channel pipes 70 extend from each of opposing sides of the pump assembly 68. Thus, six two-channel pipes 72, three on each side of the pump assembly 68, are used. In one or more other embodiments of the present invention, the amount of single channel pipes 70 used may be different than the amount used in FIG.5. Similarly, in one or more other embodiments of the present invention, the amount of two-channel pipes 72 used may be different than the amount used in FIG.5.

Figure 6:
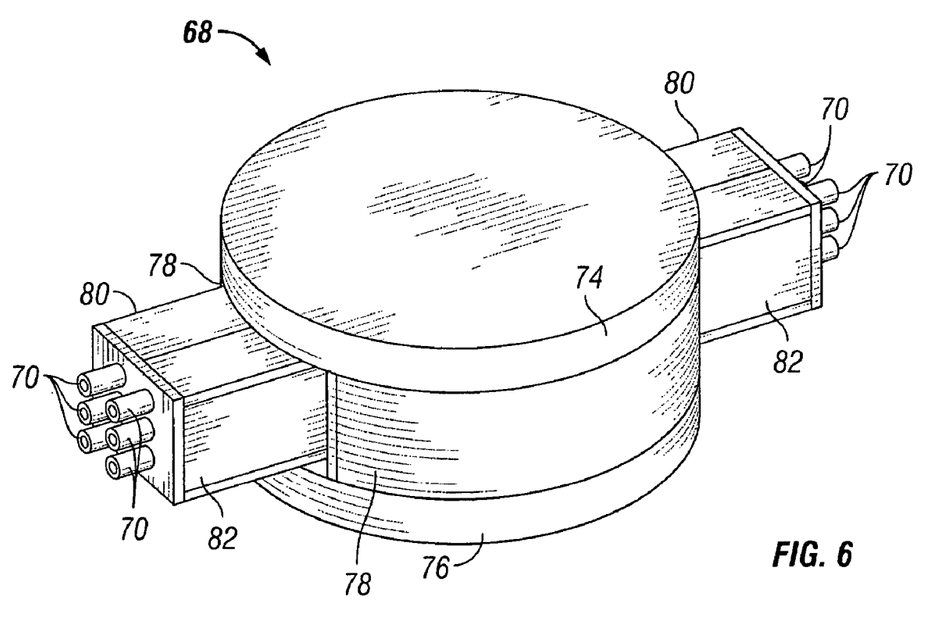
FIG.6 shows a portion of a heat sink in accordance with an embodiment of the present invention.

FIG.6 shows a portion of the pump assembly 68 in accordance with an embodiment of the present invention. As described further below with reference to FIG.9, the pump assembly 68 induces a magnetic field. Accordingly, the pump assembly 68 is provided with a top shield 74, a bottom shield 76, and side shields 78 to isolate the magnetic field from outside the body of the pump assembly 68. In one or more embodiments of the present invention, any combination of the top shield 74, the bottom shield 76, and side shields 78 may be formed of a ferromagnetic shielding material such as, for example, iron, nickel, and/or cobalt.

Still referring to FIG.6, each of the single channel pipes 70 are grouped into one of two piping assemblies 80, 82 that each house one group of single channel pipes 70. Further, in one or more embodiments of the present invention, one or more of the two piping assemblies 80, 82 may be made of an electrically non-conductive material.

Figure 7A:
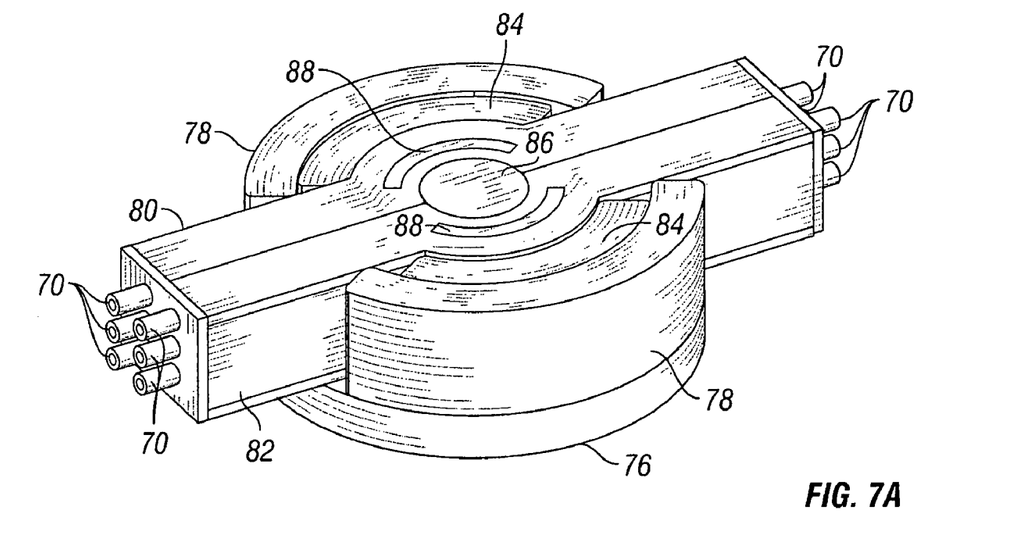
FIG.7A shows a portion of a heat sink in accordance with an embodiment of the present invention.
Figure 7B:
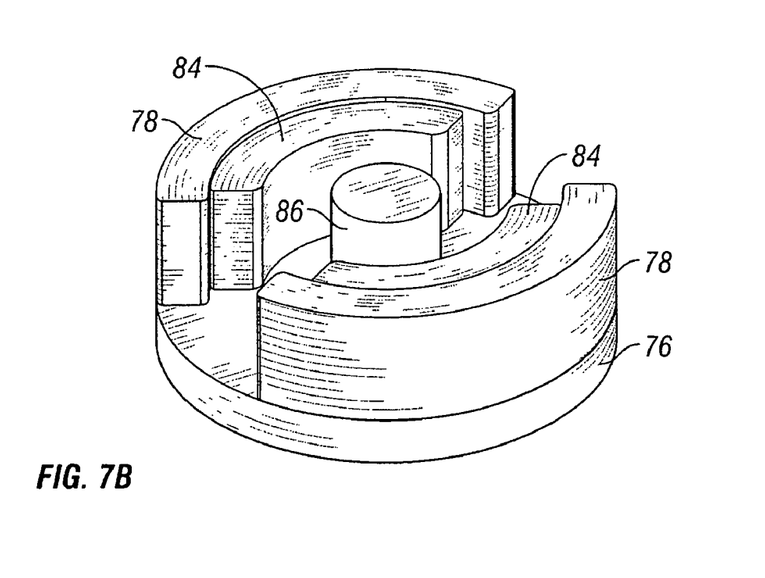
FIG.7B shows a portion of a heat sink in accordance with an embodiment of the present invention.

FIG.7A shows a portion of the pump assembly 68 (without the top shield 74) in accordance with an embodiment of the present invention. The pump assembly 68 is formed of magnets 84 that are positioned adjacent to rounded portions of piping assemblies 80, 82. A cylindrical ferromagnetic metal piece 86 is positioned between rounded portions of piping assemblies 80, 82. Further, metal conductor pieces 88 are positioned atop and underneath (not shown) rounded portions of piping assemblies 80, 82. FIG.7B shows the portion of the pump assembly 68 shown in FIG.7A without piping assemblies 80, 82 and metal conductor pieces 88.

In one or more embodiments of the present invention, the metal conductor pieces 88 may be formed of, for example, copper. Further, in one or more embodiments of the present invention, the cylindrical ferromagnetic metal piece 86 may be formed of, for example, iron, nickel, and/or cobalt.

Figure 8:
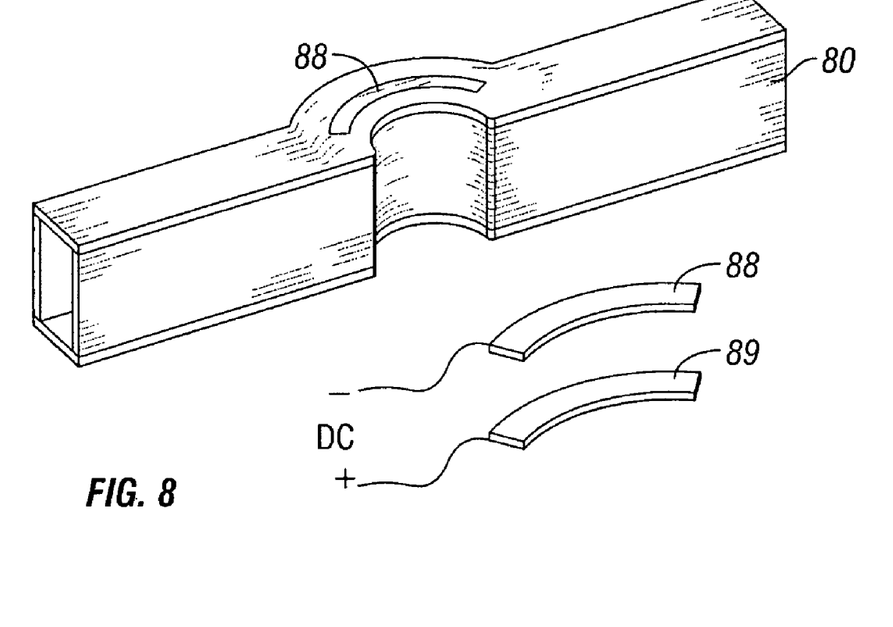
FIG.8 shows a portion of a heat sink in accordance with an embodiment of the present invention.

FIG.8 shows an exemplary piping assembly 80 in accordance with an embodiment of the present invention. Metal conductor piece 88 is positioned atop a rounded portion of the piping assembly 80. As described above, another metal conductor piece 89 is positioned underneath the rounded portion of the piping assembly 80.

As shown in FIG.8, the top metal conductor piece 88 is negatively DC polarized, and the bottom metal conductor piece 89 is positively DC polarized.

This may be achieved through application of a voltage source across the top metal conductor piece 88 and the bottom metal conductor piece 89. Accordingly, a current is induced between the conductor pieces 88, 89. Those skilled in the art will note that similar features apply to piping assembly 82 (not shown in FIG.8).

Figure 9:
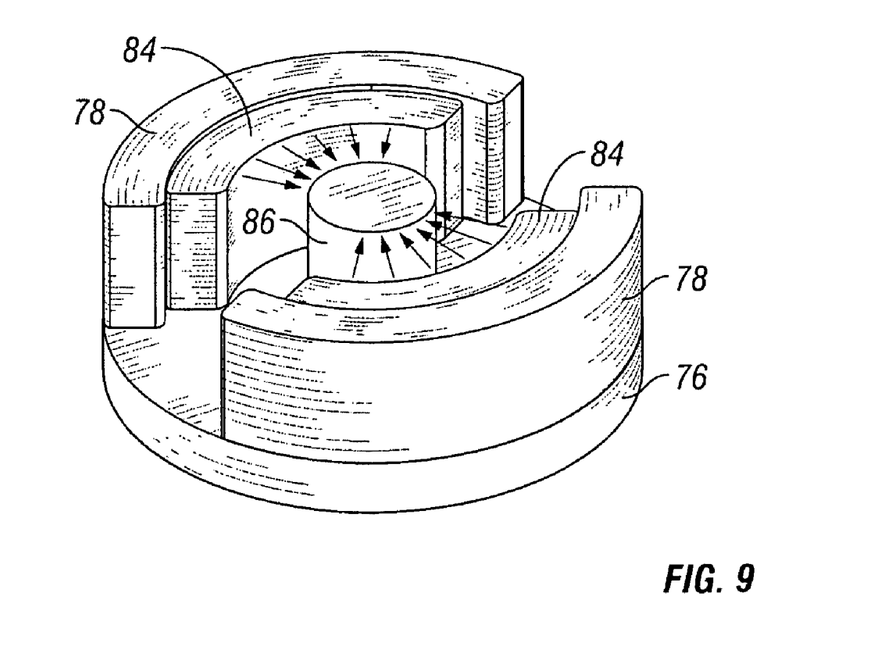
FIG.9 shows a portion of a heat sink in accordance with an embodiment of the present invention.

When piping assemblies 80, 82 and their associated metal conductor pieces are positioned within the pump assembly 68, a magnetic field is induced as indicated by the arrows shown in FIG.9. Those skilled in the art will understand why the direction of the magnetic field is as shown in FIG.9. Generally, the direction of the magnetic field in FIG.9 is a result of the position of magnets 84 and the DC polarized metal conductor pieces (not shown).

The strength of the magnetic field shown in FIG.9 may be varied by, for example, changing the grade of the magnets 84 and/or adjusting the gap distance of the magnets 84.

Figure 10:
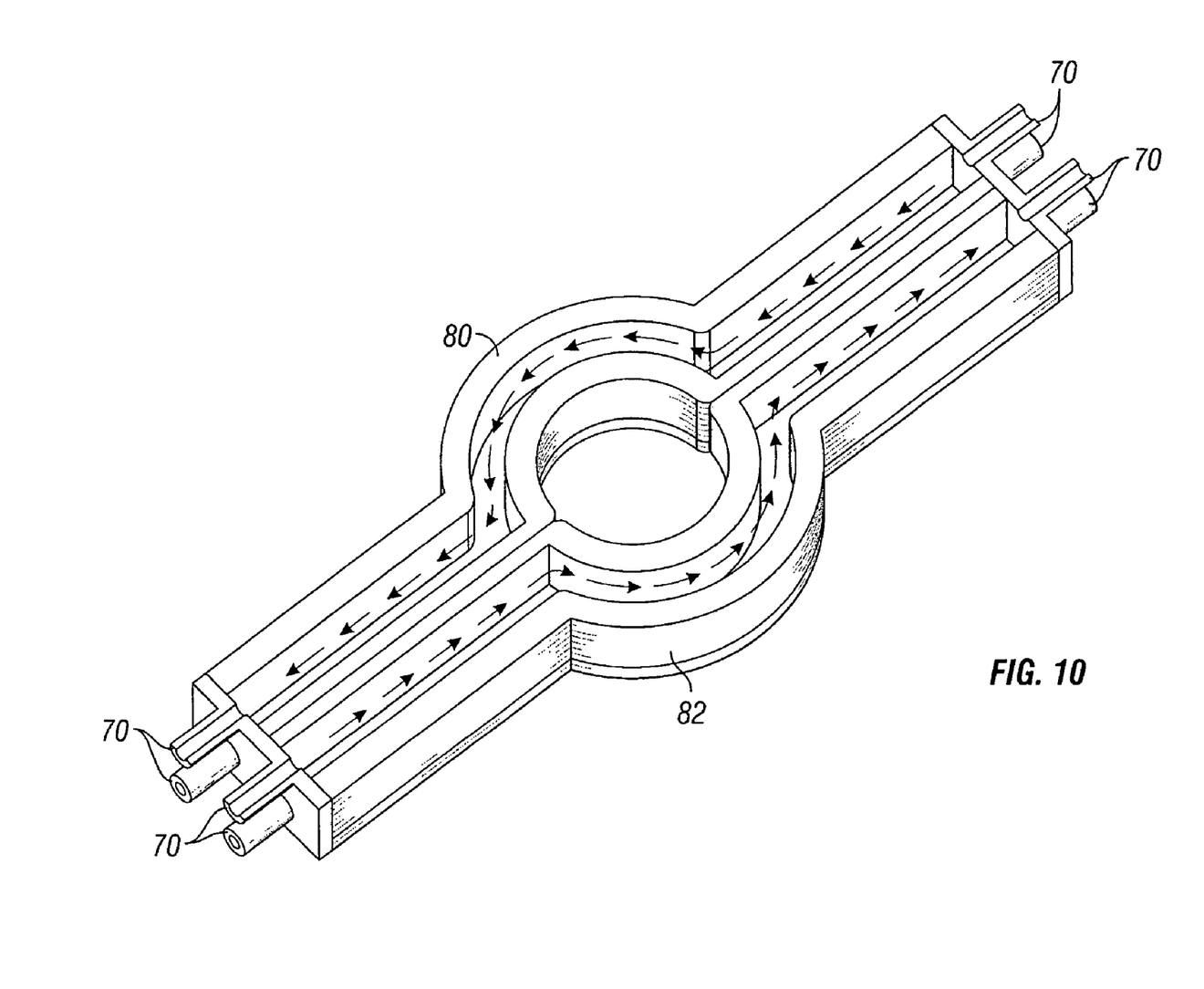
FIG.10 shows a portion of a heat sink in accordance with an embodiment of the present invention.

The direction of the magnetic field shown in FIG.9 induces fluid flow within piping assemblies 80, 82 as shown in FIG.10. As indicated by the arrows in FIG.10, the direction of fluid flow in piping assembly 80 is opposite to the direction of fluid flow in piping assembly 82.

Those skilled in the art will note that the direction of fluid flow in piping assemblies 80, 82 may be reversed by changing the polarity of the metal conductor pieces 88, 89.

Figure 11:
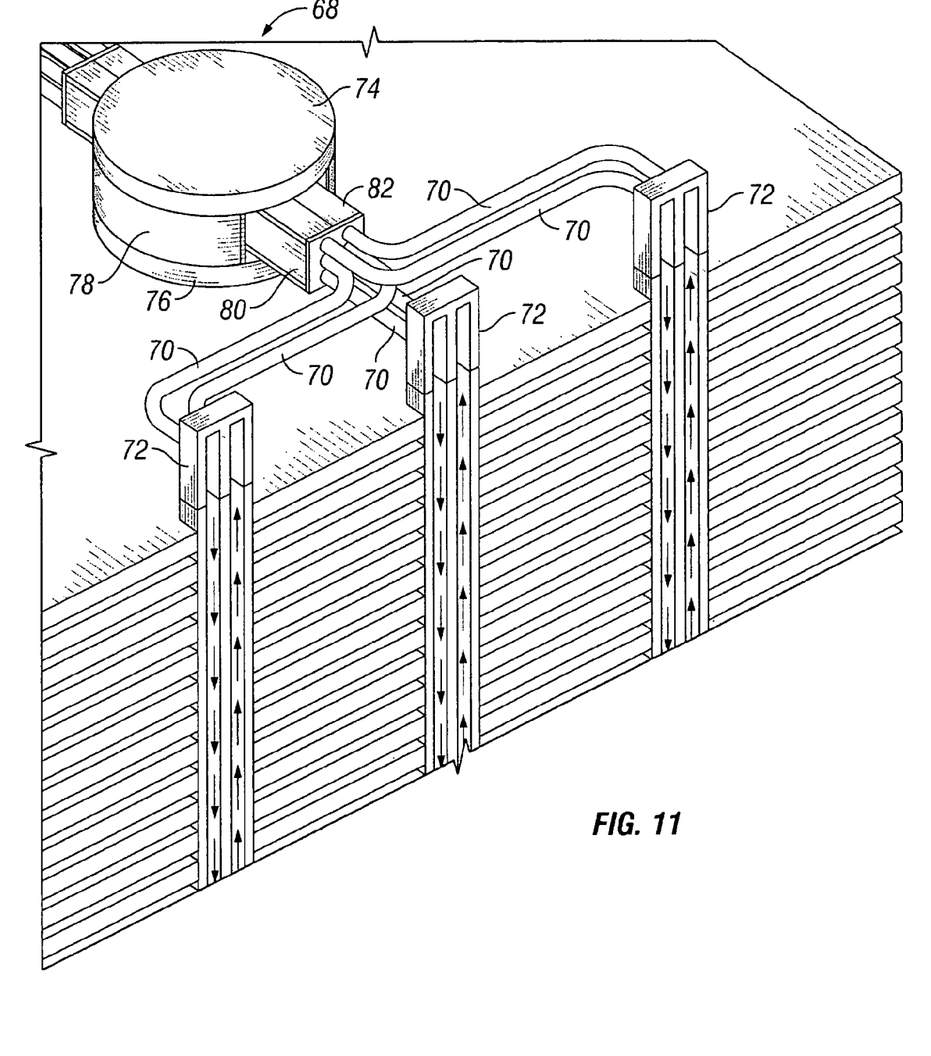
FIG.11 shows a portion of a heat sink in accordance with an embodiment of the present invention.

As described above, each of the piping assemblies 80, 82 is connected to a particular group of single channel pipes 70. The single channel pipes 70 each connect to one of a plurality of two-channel pipes 72. Each two-channel pipe 72 has two channels that are used to propagate fluid in opposite directions. This flow is induced by the magnetic field generated in pump assembly 68 as described above with reference to FIGS. 9 and 10. FIG.11 shows exemplary fluid flow (as indicated by arrows) in the two-channel pipes 72.

Those skilled in the art will note that fluid circulated in the heat sink 60 may be electrically conductive so as to be effectible by a magnetic field.

Further, because the fluid circulated in the heat sink 60 may also be thermally conductive, there is increased heat transfer between the fluid and the heat sink fins (shown in FIG.11, but not labeled).

Figure 12:
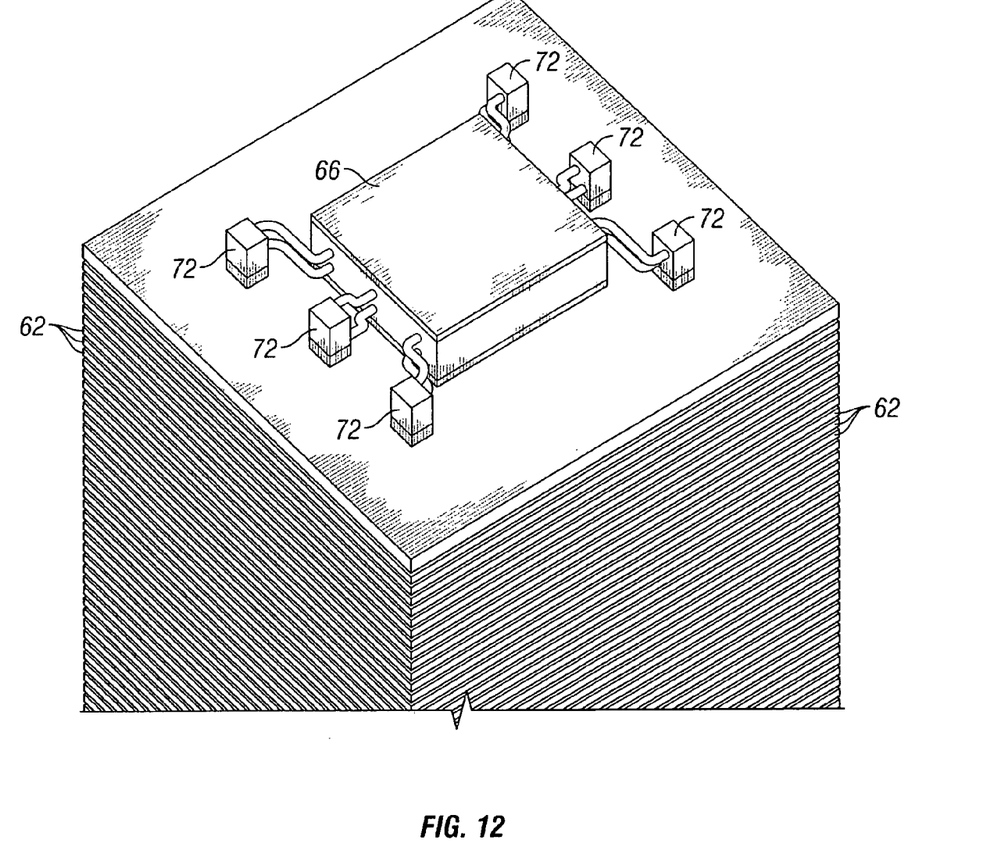
FIG.12 shows a bottom view of a heat sink in accordance with an embodiment of the present invention.

The two-channel pipes 72 extend from the top of the heat sink 60, through the heat sink 60, to the bottom of the heat sink 60. As shown in FIG.12, the two-channel pipes 72 connect to heat exchanger assembly 66 positioned at the bottom of the heat sink 60.

Figure 13:
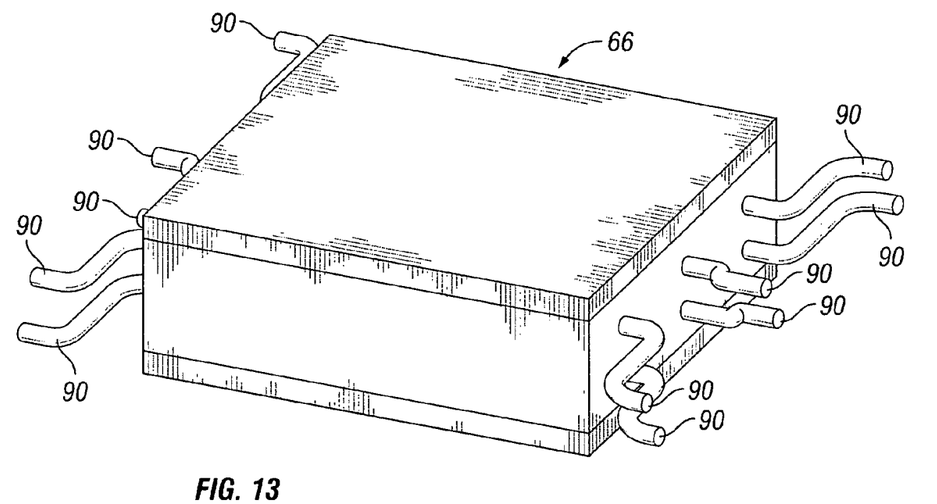
FIG.13 shows a portion of a heat sink in accordance with an embodiment of the present invention.

FIG.13 shows an exemplary heat exchanger assembly 66 in accordance with an embodiment of the present invention. As described above, the heat exchanger assembly 66 is positioned on the bottom of the heat sink 60. As shown in FIG.13, the heat exchanger assembly 66 is connected to pipes 90 that each connect to one of a plurality of the two-channel pipes 72 (not shown in FIG.13, but shown in FIG.12).

In one or more embodiments of the present invention, the heat exchanger assembly 66 is formed of, for example, copper, so as to be better capable of conducting heat generated from a heat source (e.g., an integrated circuit) to which the heat exchanger assembly 66 is attached.

Figure 14:
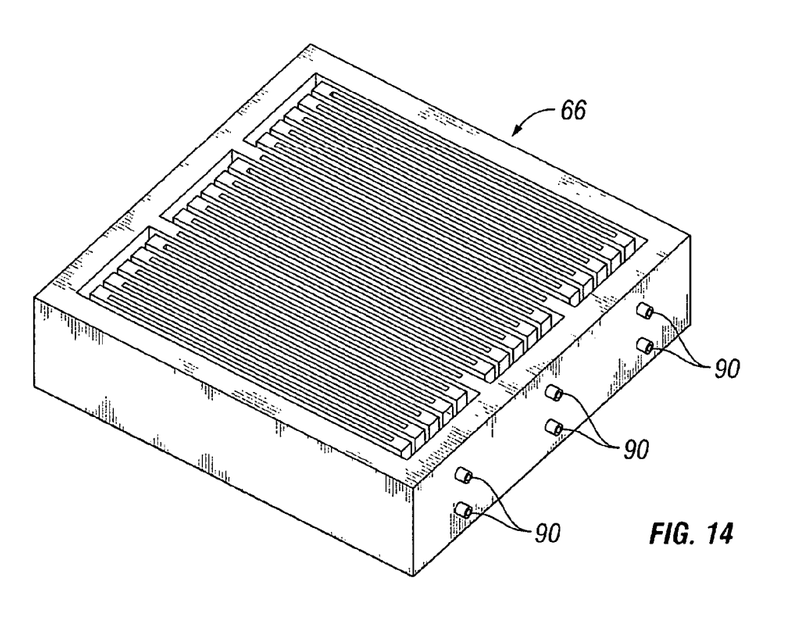
FIG.14 shows a portion of a heat sink in accordance with an embodiment of the present invention.
Figure 15:
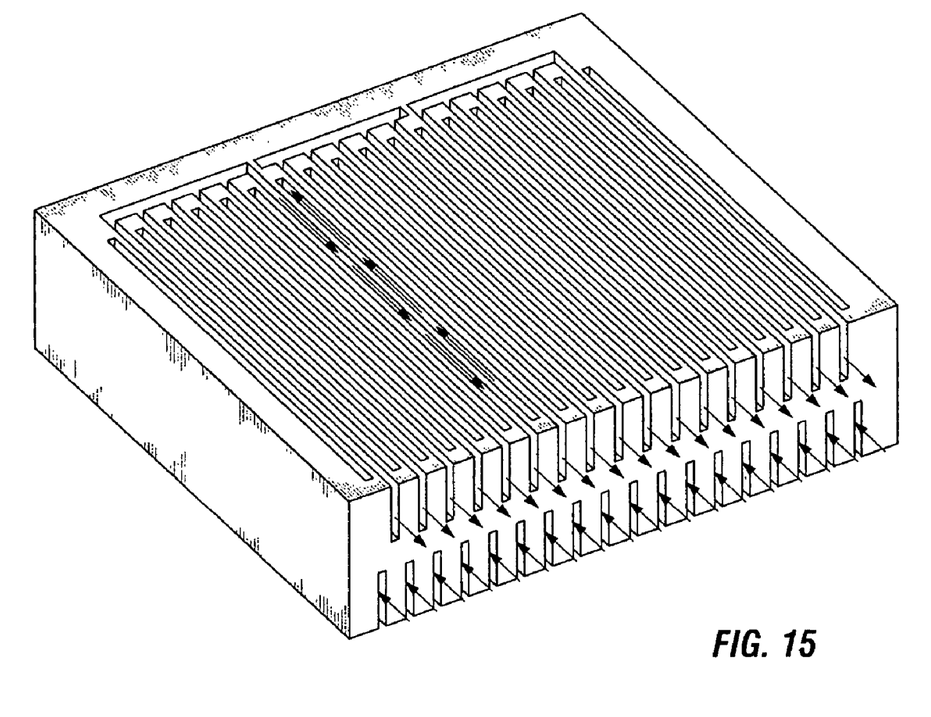
FIG.15 shows a portion of a heat sink in accordance with an embodiment of the present invention.

FIG.14 shows an inside view of the heat exchanger assembly 66. The heat exchanger assembly 66 is formed of many "micro" channels (shown, but not labeled). When the heat exchanger assembly 66 is shown in cross-section as in FIG.15, it becomes clear to see how fluid may flow (as indicated by the arrows) through the "micro" channels. The thinness of a wall between two adjacent "micro" channels facilitates heat transfer between fluid flowing in opposite directions through the two adjacent "micro" channels.

Advantages of the present invention may include one or more of the following. In one or more embodiments of the present invention, because a heat sink uses a pump assembly that generates a magnetic field to drive fluid flow within the heat sink, the fluid flow rate may be increased, thereby resulting in increased heat transfer from a heat source to heat sink fins that dissipate heat to outside air.

In one or more embodiments of the present invention, a heat sink pump assembly for generating a magnetic field to drive fluid flow within the heat sink is shielded.

In one or more embodiments of the present invention, a heat sink uses a pump assembly for generating a magnetic field to induce fluid flow in opposite directions, where one direction of flow is toward a heat source and the other is away from the heat source.

In one or more embodiments of the present invention, a heat sink pump assembly for generating a magnetic field to drive fluid flow within the heat sink is circular and compact in design.

In one or more embodiments of the present invention, a heat sink uses a heat exchanger assembly having "micro" channels to facilitate increased heat transfer from fluid carrying heat to fluid carrying less heat.

In one or more embodiments of the present invention, a magnetic field generated to induce fluid flow within a heat sink may be easily changed so as to reverse the direction of fluid flow.

In one or more embodiments of the present invention, a heat sink uses a two-channel pipe that may enhance heat transfer between the two-channel pipe and heat sink fins.

In one or more embodiments of the present invention, a heat sink uses a two-channel pipe that may enhance heat transfer between opposite flows of fluid in the two adjacent channels of the two-channel pipe.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a heat source; and
   a heat sink operatively connected to the heat source, the heat sink comprising:
      a body having a plurality of fins,
      a pump assembly disposed on a top surface of the body opposite the heat source,
      a heat exchanger assembly disposed on a bottom surface of the body nearest to the heat source,
      a plurality of pipes that each individually extend from above the top surface of the body through the body to below the bottom surface of the body and each individually connects to the pump assembly and the heat exchanger assembly,
      a first channel partially disposed in each of the plurality of pipes and arranged to carry a fluid,
      a second channel partially disposed in each of the plurality of pipes and arranged to carry the fluid;
   wherein the pump assembly generates a radial magnetic field that controls a flow direction of the fluid in the first channel and the second channel, and
   the radial magnetic field causes the flow direction in the first channel to be opposite to the flow direction in the second channel.

2. The computer system of claim 1, the heat sink further comprising:

an electrically non-conductive metal arranged to house a portion of at least one of the first channel and the second channel in the pump assembly.

3. The computer system of claim 1, wherein flow direction in the first channel is toward the heat source, and wherein flow direction in the second channel is away from the heat source.

4. The computer system of claim 1, wherein the heat source is an integrated circuit.

5. The computer system of claim 1, wherein the pump assembly is circular.

6. The computer system of claim 1, the pump assembly comprising:
 a magnet;
 a piping assembly housing at least a portion of at least one of the first channel and the second channel; and
 a first metal conductor piece connected to a first surface of the piping assembly.

7. The computer system of claim 6, the pump assembly further comprising:
 a second metal conductor piece connected to a second surface of the piping assembly.

8. The computer system of claim 7, wherein the first metal conductor piece and the second metal conductor piece are oppositely polarized.

9. The computer system of claim 7, the pump assembly further comprising:
 a plurality of ferromagnetic metal pieces arranged to shield the magnet, the first metal conductor piece, and the second metal conductor piece.

10. The computer system of claim 9, wherein at least one of the plurality of ferromagnetic metal pieces is formed of at least one of iron, nickel, and cobalt.

11. The computer system of claim 7, wherein at least one of the first metal conductor piece and the second metal conductor piece is formed of copper.

12. The computer system of claim 6, the pump assembly further comprising:
 a cylindrical ferromagnetic metal piece disposed in a center of the pump assembly, wherein a portion of the piping assembly is disposed between the magnet and the cylindrical metal piece.

13. The computer system of claim 12, wherein the cylindrical ferromagnetic metal piece of formed of at least one of iron, nickel, and cobalt.

14. The computer system of claim 1, wherein the heat exchanger assembly is connected to at least one of the first channel and the second channel, the heat exchanger assembly comprising:
 a plurality of channels arranged to facilitate heat transfer between fluid flowing in the first channel and the second channel.

15. The computer system of claim 1, wherein the heat exchanger assembly is attached to the heat source.

16. The computer system of claim 1, wherein at least a portion of the heat exchanger assembly is formed of copper.

17. The computer system of claim 1, wherein the fluid is at least one of thermally conductive and electrically conductive.

18. A heat sink, comprising:
 a body having a plurality of fins;
 a pump assembly disposed on a top surface of the body;
 a heat exchanger assembly disposed on a bottom surface of the body;
 a plurality of pipes that each individually extend from above the top surface of the body through the body to below the bottom surface of the body and each individually connects to the pump assembly and the heat exchanger assembly;
 a first channel partially disposed in each of the plurality of pipes and arranged to carry a fluid;
 a second channel partially disposed in each of the plurality of pipes and arranged to carry the fluid;
 wherein the pump assembly generates a radial magnetic field that controls a flow direction of the fluid in the first channel and the second channel, and
 the radial magnetic field causes the flow direction in the first channel to be opposite to the flow direction in the second channel.

19. The heat sink of claim 18, the pump assembly comprising:
 a piping assembly arranged to house at least a portion of at least one of the first channel and the second channel;
 a first polarized copper metal piece disposed on a first surface of the piping assembly;
 a second polarized copper metal piece disposed on a second surface of the piping assembly; and
 a magnet disposed alongside at least a portion of the piping assembly.

20. The heat sink of claim 18, the pump assembly comprising:
 a ferromagnetic bottom piece;
 a ferromagnetic top piece; and
 at least one ferromagnetic side piece,
 wherein the bottom ferromagnetic piece, the top ferromagnetic piece, and the at least one ferromagnetic side piece are arranged to shield the radial magnetic field.

21. The heat sink of claim 18, the heat exchanger assembly comprising:
 a plurality of channels each arranged to propagate fluid in one of the fluid flow directions of the first channel and the second channel.

22. The heat sink of claim 18, wherein the heat exchanger assembly is at least partially formed of copper.

* * * * *